Butler, Dunham & Wann.
Tool for Sharpening Horse Shoes.
N° 85,997. Patented Jan. 19, 1869.
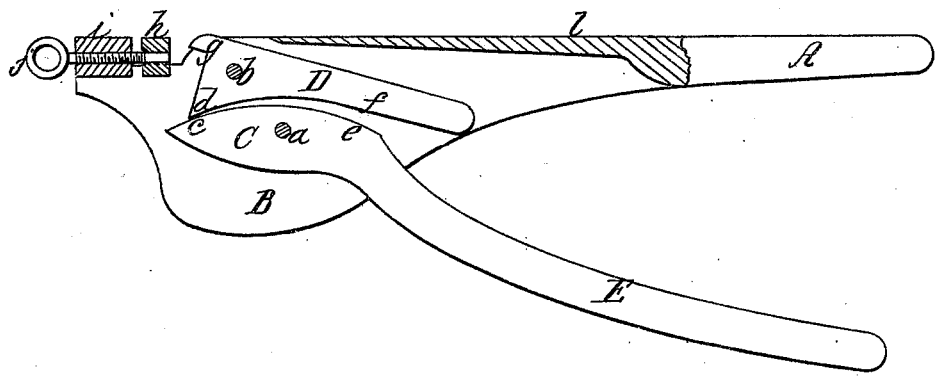
Witnesses;
Gustave Dieterich
Wm Van Morgan
Inventors;
O. E. Butler
S. P. Dunham
G. K. Wann
per Munn &
Attorneys

ORREN E. BUTLER, STEPHEN P. DUNHAM, AND GEORGE K. WANN, OF MARSHALLTOWN, IOWA.

Letters Patent No. 85,997, dated January 19, 1869.

---

IMPROVEMENT IN TOOL FOR SHARPENING THE CALKS OF HORSE-SHOES.

---

The Schedule referred to in these Letters Patent and making part of the same.

---

*To all whom it may concern:*

Be it known that we, ORREN E. BUTLER, STEPHEN P. DUNHAM, and GEORGE K. WANN, of Marshalltown, in the county of Marshall, and State of Iowa, have invented a new and improved Tool for Sharpening Horse-Shoes; and we do hereby declare that the following is a full, clear, and exact description thereof, which will enable others skilled in the art to make and use the same, reference being had to the accompanying drawings, forming part of this specification, in which the drawing represents a sectional side view of our invention.

This invention relates to an improved tool for sharpening horse-shoe calks; and

It consists in the combination of parts, constructed and operating as will be hereinafter more fully described.

In the drawings—

A is the handle of the tool, and is formed with two cheek-plates, B, which afford bearings or location for the studs $a$ $b$ of the head C and the cutter D, respectively, which latter parts operate within the cheeks B, as shown.

The head C forms part of the handle E, the said head having a curved face, $c$ $c$, which conforms somewhat to the proximate face $d$ $f$ of the cutter, which proximate face is curved also.

$g$ is a cutting-nib, forming part of the cutter D, and its edge is arranged to press the calk between it and the plate $h$, which latter part rests on the edges of the cheeks, and is adjusted to or from the nib by means of an adjusting-screw, $j$, working in the part $i$, uniting the two cheeks.

By separating the handles A and E, the part $c$ of the head C bears upon the point $d$ of the cutter, and bears the nib $g$ away from the plate $h$.

The tool is then set on the calk, (while the shoe is on the foot,) and the handles are again brought toward each other, in which latter operation the part $c$ of head bears against the part $f$ of the cutter, and acts with a compound leverage to press the nib against the calk with great force, thereby cutting off the dulled point of the same with a bevelling cut, and leaving the calk sharp.

One of the cheeks is broken away in the drawing to show the action of the internal parts, and the part $l$, uniting the two cheeks.

The end of the screw $j$ works loosely in the plate $j$, being held within the same by a collar or head on the screw fitting within a suitable recess in the said plate.

By moving this plate to or from the nib, the calk can be cut off at the desired distance from the shoe.

The whole of the tool is made of metal.

Having thus described our invention,

We claim as new, and desire to secure by Letters Patent—

The combination of the adjustable plate $h$, screw $j$, and part $i$, operating as described, with the handle A, having cheeks B, the cutter D, and the handle E, having a head, C, all operating substantially as set forth.

ORREN E. BUTLER.
STEPHEN P. DUNHAM.
GEORGE K. WANN.

Witnesses:
WILLIAM H. WEATHERBY,
F. BAUM.